United States Patent [19]
Duran

[11] Patent Number: 5,340,255
[45] Date of Patent: Aug. 23, 1994

[54] PLUG LOCKING ASSEMBLY

[75] Inventor: John A. Duran, Glendora, Calif.

[73] Assignee: Avibank Mfg., Inc., Burbank, Calif.

[21] Appl. No.: 53,184

[22] Filed: Apr. 26, 1993

[51] Int. Cl.$^5$ .................. F16B 19/00; F16B 33/00; F16B 37/14

[52] U.S. Cl. .................. 411/373; 411/348; 411/429; 411/910

[58] Field of Search .............. 411/371, 372, 373, 377, 411/348, 429, 431, 910

[56] References Cited

U.S. PATENT DOCUMENTS

| | | | |
|---|---|---|---|
| 2,316,695 | 4/1943 | Jaffa | 411/910 X |
| 3,914,965 | 10/1975 | Paxton | 411/348 X |
| 4,136,598 | 1/1979 | Hughes | 411/372 |
| 4,223,799 | 9/1980 | Eyster et al. | 411/429 X |
| 4,621,230 | 11/1986 | Crouch et al. | 411/373 X |
| 4,683,670 | 8/1987 | Bates | 411/373 |
| 4,988,248 | 1/1991 | Flux | 411/348 |

FOREIGN PATENT DOCUMENTS 2239146  2/1975  France ................ 411/373

Primary Examiner—Neill R. Wilson
Attorney, Agent, or Firm—Poms, Smith, Lande & Rose

[57] ABSTRACT

A plug locking assembly for installation in an aircraft panel or the like. The plug assembly is coupled to a receptacle mounted in a recess in the panel. A spring biased detent locking mechanism is reciprocally mounted in the plug assembly movable from a first position wherein the detents of the detent locking mechanism are trapped in the plug assembly to a second position wherein the detents lock the plug assembly within a chamber in the receptacle. The upper surface of the plug assembly is flush with the upper surface of the panel and can be unlocked automatically therefrom.

25 Claims, 4 Drawing Sheets

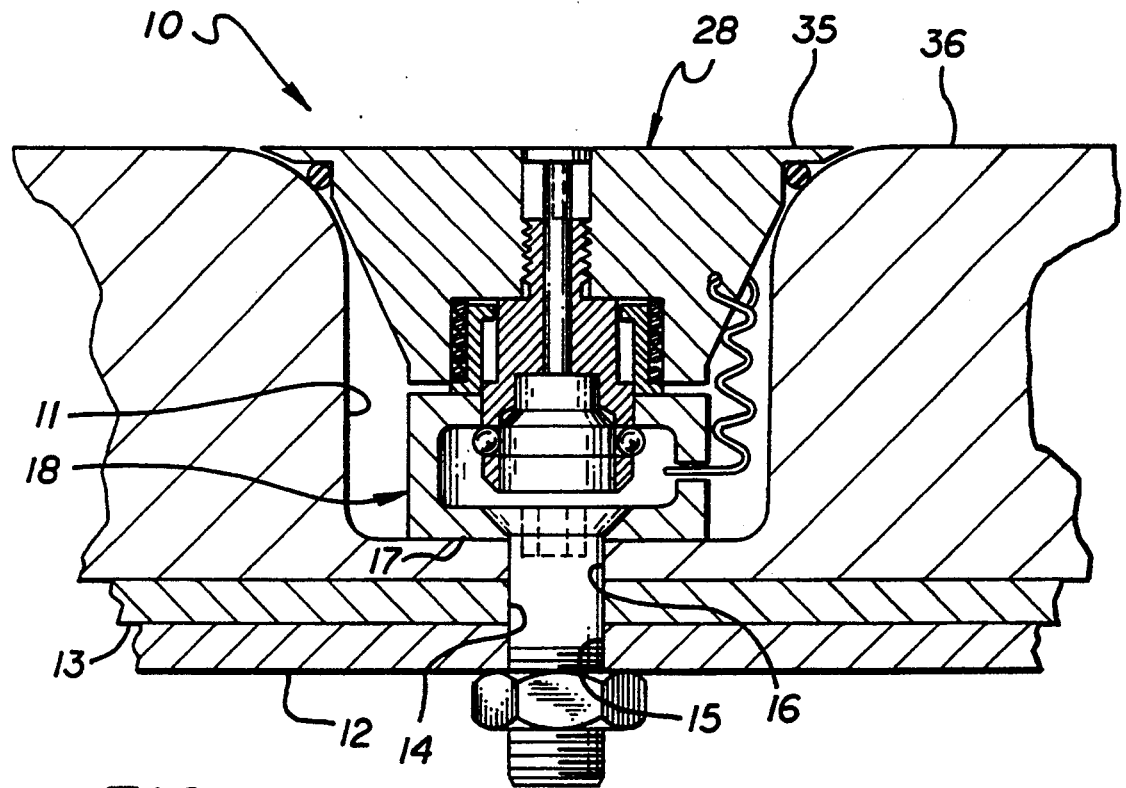
FIG. 1
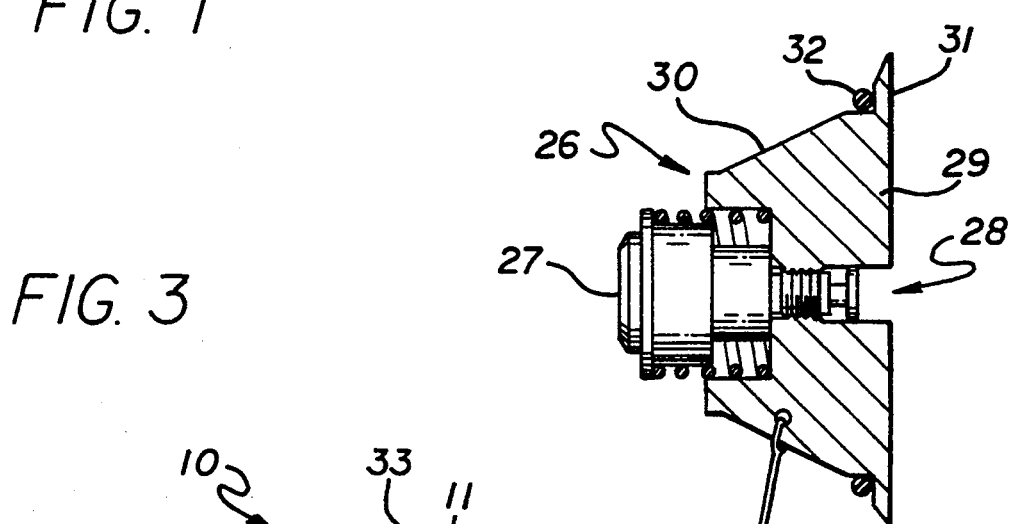
FIG. 3
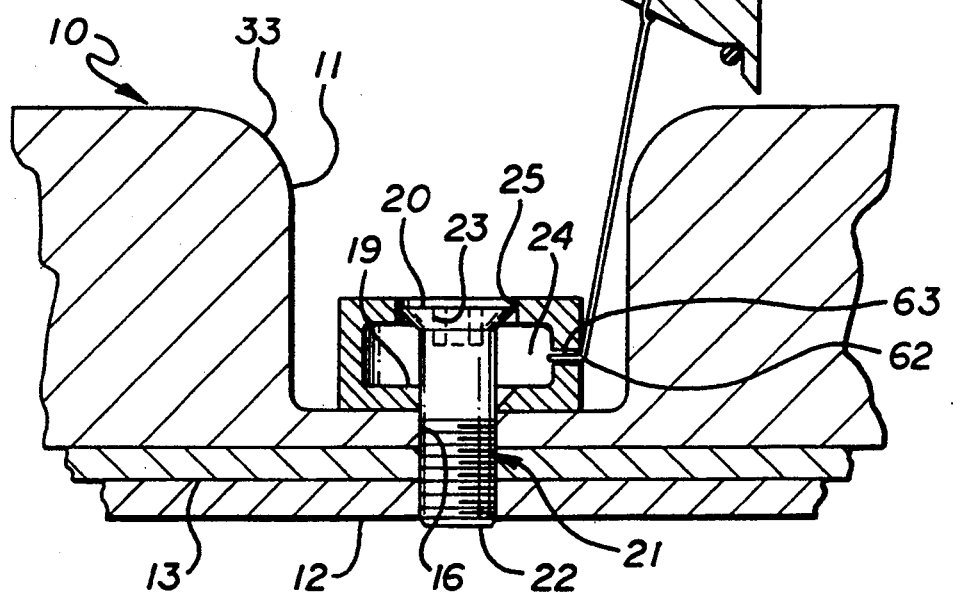

PLUG LOCKING ASSEMBLY

BACKGROUND OF THE INVENTION

FIELD OF THE INVENTION

The invention relates to locking mechanisms; and, more particularly, to a plug locking mechanism for closing off an opening in an aircraft panel or the like.

2. DESCRIPTION OF THE PRIOR ART

Various types of locking mechanisms for use on aircraft panels or the like are well known in the art. Prior locking mechanisms are described and illustrated in U.S. Pat. Nos. 3,917,331 and 3,948,549. In these patents, detent locking means are used to lock an aircraft structural member into an opening in an aircraft panel or the like.

On aircraft panels in use today, it is quite often necessary to eliminate metal components from the panel surface. However, since mechanical fasteners are still required to ensure strength integrity, the manufacturers of such aircraft are designing special non-metallic panels where the metal fasteners are buried into a cavity formed in the panel. The cavity is then closed off or covered up with suitable material or assembly.

There is a need for a non-metallic plug for filling up or closing off such non-metallic cavities. Such a plug should remain trapped to the cavity and contamination should be eliminated between the exterior of the cavity and plug. The plug should also be perfectly flush with the area of the panel surrounding the cavity and should be able to be unlocked automatically by use of an installation tool.

SUMMARY OF THE INVENTION

It is an object of this invention to provide a plug assembly for closing off a cavity in a panel.

It is a further object of this invention to provide a nonmetallic plug closing off a cavity in a non-metallic panel wherein a metallic fastener assembly secures the panel to a panel sub-assembly.

It is still another object of this invention to carry out the foregoing objects wherein the plug is tethered to the fastener assembly.

It is another object of this invention to carry out the foregoing objects wherein the plug assembly is releasably locked to the fastener assembly.

These and other objects are preferably accomplished by providing a plug assembly coupled to a receptacle mounted in a recess in a panel. A spring biased detent locking mechanism is reciprocally mounted to the plug assembly movable from a first position wherein the detents of the detent locking mechanism are trapped in the plug assembly to a second position wherein the detents lock the plug assembly within a chamber in the receptacle. The upper surface of the plug assembly is flush with the upper surface of the panel and can be unlocked automatically therefrom.

BRIEF DESCRIPTION OF THE DRAWING

FIG. 1 is an elevational sectional view of the assembly of the invention showing final installation in an installation;

FIGS. 3 through 7 are elevational sectional views illustrating various positions in the installation of the plug assembly of FIG. 1.

DESCRIPTION OF THE PREFERRED EMBODIMENT

Figure 2:
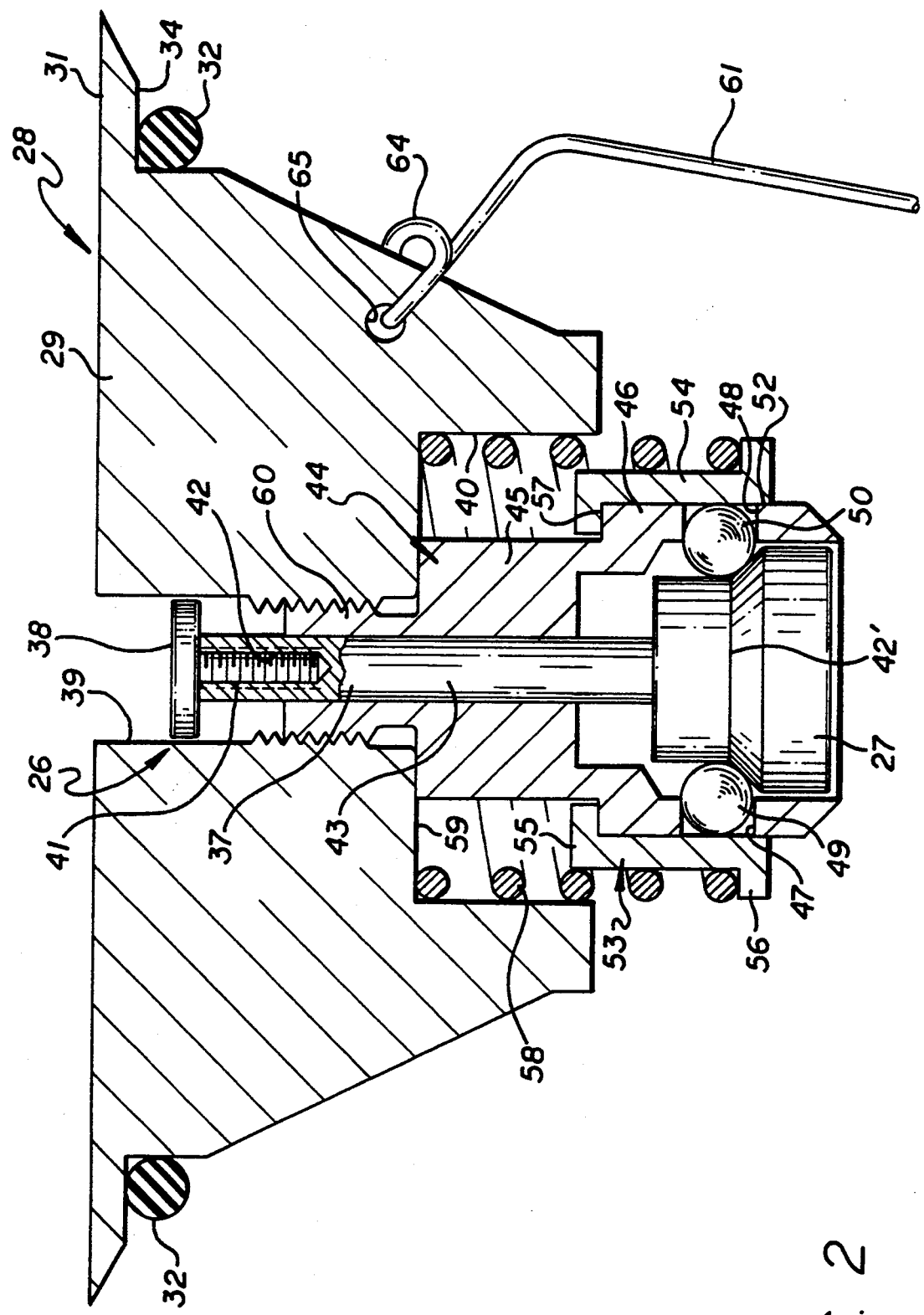
FIG. 2 is an elevational sectional view showing the plug assembly of the invention prior to being installed in the locking position of FIG. 1.

Referring now to FIG. 1 of the drawing, an installation 10 is shown, which may be a hatch or door or other support structure of an aircraft or the like. A cavity 11 is formed through installation 10. A pair of mating panels 12, 13, having apertures 14, 15, respectively, aligned with aperture 16 at the lower end of cavity 11, are mounted adjacent the underside 17 of installation 10.

A rectangular receptacle 18 is disposed internally of cavity 11 having a countersunk opening 19 (see also FIG. 3) at the bottom thereof for receiving therein the tapered head 20 of a bolt 21. Bolt 21 has a threaded portion 22 extending through apertures 14, 15, for threading to a nut 67 (FIG. 1). Bolt 21 also has a hexagonally shaped recess 23 (FIG. 3) in head 20.

Receptacle 18 is hollow on the interior 24 and has an opening 25 at its upper end wider than countersunk opening 19 through which extends the lower end 27 of a ball detent pin locking means 26 mounted in a plug member 28.

Plug member 28 has a main body portion 29 (FIG. 2) tapered at tapered end 30 with an upper outwardly extending peripheral flange 31. A resilient 0-ring 32 is mounted in cavity 11 (FIG. 1) between the curved upper surface 33 thereof and a peripheral undercut area 34 (FIG. 2) on the lower surface of flange 31. As seen in FIG. 1, the upper surface 35 of plug member 28 is flush with the upper surface 36 of installation 10.

Pin locking means 26 (FIG. 2) includes a plunger 37 having a head 38 at its upper end, normally flush with surface 35 of plug member 28 when properly installed, as will be discussed, and of an outer configuration, such as circular, conforming to the cross-section of a centrally located passageway 39 extending through the main body portion 29 of plug member 28 to a wider cavity 40 at the lower end of plug member 28.

As seen in FIG. 2, head 38 may have a threaded shaft 41 threaded into a threaded aperture 42 in an elongated shaft 43 terminating at the bottom in aforementioned lower end 27 of pin locking means 26. Lower end 27 is connected to reduced diameter section 42' connected to shaft 43.

Shaft 43 reciprocates in a ball detent housing means 44 having an upper portion 60 of main body portion 45 threaded in passageway 39 via mating threads 60' on portion 60 and threads 60" on the inner wall of passageway 39. Main body portion 45 also has a lower end 46, of greater outer diameter than main body portion 41, with ball detent receiving openings 47, 48 on opposite sides thereof. Ball detents, such as balls 49, 50, respectively, are mounted in each opening 47, 48 disposed in reduced section 42. The outer diameters of balls 49, 50 are related to the diameter of openings 47, 48 and can extend thereout, as seen in FIG. 1. However, openings 47, 48 are peened or staked, as at peening areas 51, 52, respectively, to prevent withdrawal of balls 49, 50 out of and through openings 47, 48, respectively.

A sleeve assembly 53 encircles the lower end 46 of main body portion 45 having a main generally cylindrical body portion 54, an inwardly extending peripheral flange 55 at top and an outwardly extending peripheral flange 56 at bottom. As seen in FIG. 2, body portion 54 conforms to the outer configuration of the lower end 46 of main body portion 45 with flange 55 abutting at top against the shoulder 57 formed at the intersection of main body portion 45 and lower end 46.

A compression spring 58 encircles the main body portion 54 of sleeve assembly 53 abutting at top against the upper wall 59 of cavity 40 (when in the FIG. 2 position) and at bottom against the upper surface of lower flange 56.

A flexible lanyard 61 has one end 62 (FIG. 3) extending through an opening 63 in receptacle 18 and secured thereto and the other end 64 (FIG. 2) extending through an opening 65 in the main body portion 29 of plug member 28 and also secured therein.

In operation, referring particularly to FIGS. 1 to 7, receptacle 18 (FIG. 3) is placed inside of cavity 11 of installation 10 with opening 19 thereof aligned with opening 16 of installation 10. Bolt 21 is pushed through opening 25 of receptacle 18 downwardly with threaded portion 22 extending through aligned openings 19, 16 and into engagement with panels 12, 13.

Plug member 28, interconnected to receptacle 18 through lanyard 61, is disposed out of cavity 11 as shown. The internal components of plug member 28 are in the position shown in FIG. 2, spring 58 normally biasing sleeve assembly 53 downwardly so that balls 49, 50 are trapped in openings 47, 48 abutting against reduced diameter section 42'. O-ring 32 is disposed in the undercut area 34 of plug member 28.

Figure 4:
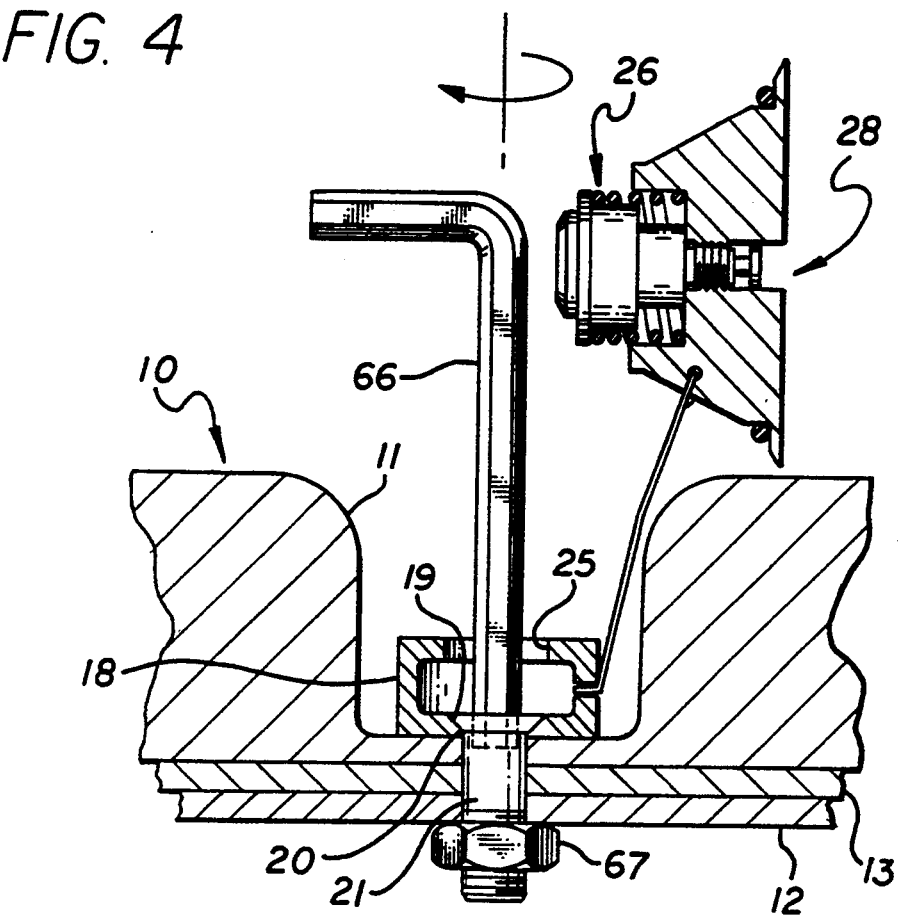
Figure 5:
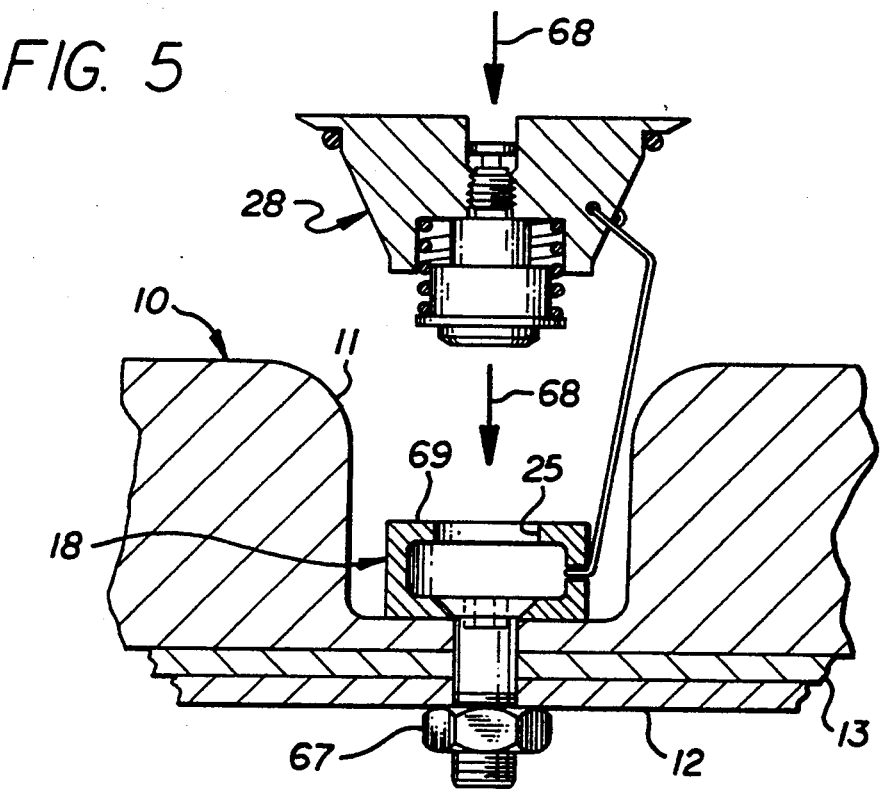

As seen in FIG. 4, a suitable tool, such as a hexagonally shaped wrench 66, is inserted through opening 25 in receptacle 18 into engagement with the like configured recess 23 in head 20 of bolt 21. Bolt 21 is thus tightened into engagement with a nut 67 thereby both fixing receptacle 18 in place and holding panels 12, 13 to the underside 17 of installation 10. The wrench 66 is selected to pass through opening 25 and bolt 21 is tightened until tapered head 20 enters into and conforms to countersunk opening 19.

Plug member 28 (FIG. 5) is now pushed in the direction of arrow 68 downwardly into cavity 11 (the inner components of plug member 28 being in the FIG. 2 position) until the lower end 46 passes through opening 25 with flange 56 of sleeve assembly 53 abutting against the upper surface 69 compressing spring 58 upwardly to the locking position shown in FIG. 1.

Balls 49, 50 are automatically released when sleeve assembly 53 moves away from openings 47, 48 to extend out of opening 47, 48 preventing withdrawal of plug member 28 out of cavity 11. O-ring 32 seals off the plug member 28 from installation 10. The upper surface 35 of plug member 28 is flush with the upper surface 36 of installation 10. The upper surface of the head 38 of plunger 37 is also flush with the upper surfaces 35 and 36. This provides a visual indication to the installer that plug member 28 is properly locked.

Figure 6:
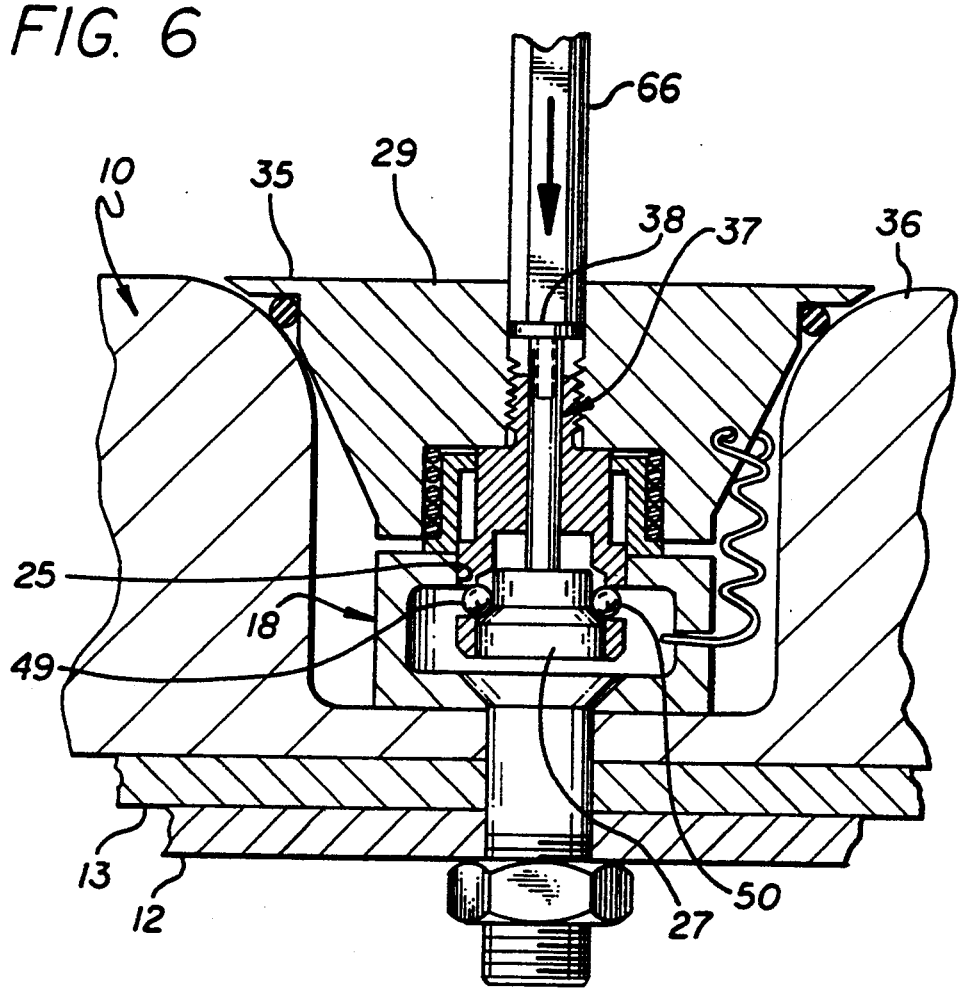
Figure 7:
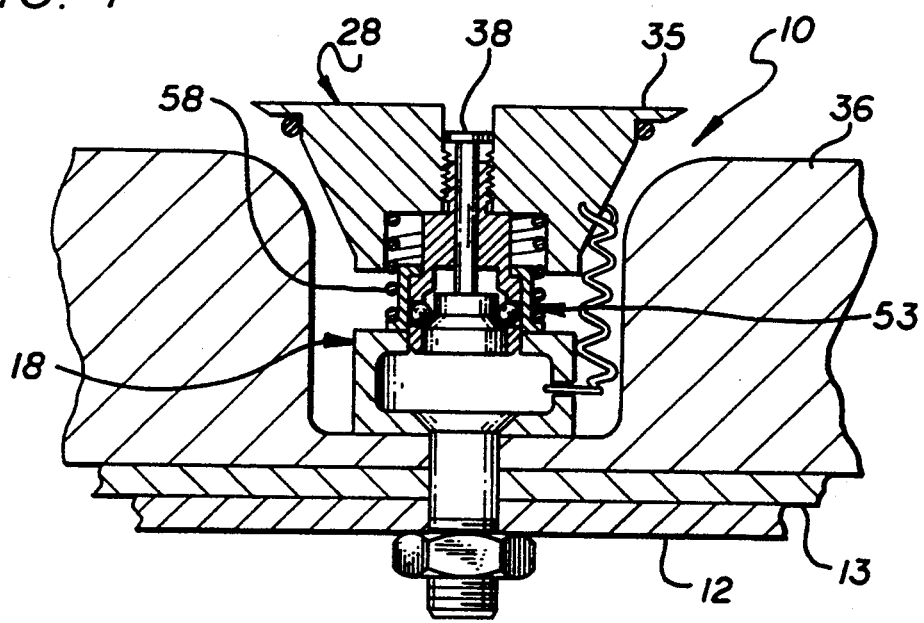

In order to release plug member 28, as seen in FIG. 6, wrench 66 is inserted into passageway 39 into engagement with head 38 of plunger 37. Wrench 66 is pushed downwardly thereby moving plunger 37 downwardly allowing balls 49, 50 to move to the position shown in FIG. 6 resulting in plug member 28 automatically popping up through and past opening 25 in receptacle 18 to the FIG. 7 position. Spring 58 pushes plug member 28 upwardly, sleeve assembly 53 again surrounding openings 47, 48, allowing removal of plug member 28. The plug member 28 can be easily removed by the installer grasping it manually.

The same tool or wrench 66 used to install the screw 21 in FIG. 4 can be used to release plug member 29 in FIG. 6 thus providing tool commonality. Bolt 21 may be metallic and, other than otherwise indicated, any suitable materials may be used. The main body portion 29 of plug member 28 is preferably non-metallic. Bolt 21 is preferably of metal.

Any suitable dimensions may be used. For example, the recess 23 in head 20 of bolt 21 may be 3 mm. in diameter, wrench 66 being of similar dimensions.

I claim:

1. An assembly for closing off a cavity in a panel having an inner configuration with an opening leading therein and an opening at bottom through said panel comprising:

a plug assembly having a main body portion having an outer configuration generally related to the configuration of at least the opening leading into said cavity;

a receptacle having a top, a bottom, and an inner hollow chamber therein with an opening at top leading into said chamber, said receptacle also having an opening at bottom aligned with both the opening at top of said receptacle and an opening at the bottom of said cavity through said panel;

a fastener extending through the opening at bottom of said receptacle and the opening at bottom of said cavity through said panel thereby holding said receptacle to said panel;

first locking means mounted in said plug assembly releasably locking to said receptacle; and including second locking means fixedly locking said plug assembly to said receptacle.

2. In the assembly of claim 1 wherein said second locking means is a flexible tether.

3. In the assembly of claim 1 wherein said first locking means is a spring biased detent assembly having a plurality of detents therein movable from a first position disposed internally of said first locking means to a second position extending out of aid first locking means whereby, when said first locking means extends through the opening at top of said receptacle into the inner chamber thereof, said detents move to said second position extending out of said first locking means into the interior of said chamber locking said first locking means to said receptacle.

4. In the assembly of claim 1 wherein said main body portion has an upper surface flush with the area of the panel surrounding said cavity.

5. In the assembly of claim 4 wherein said main body portion has a peripheral flange surrounding the upper surface thereof with a resilient 0-ring associated therewith sealing off the upper surface of said main body portion from the opening leading into said cavity.

6. In the assembly of claim 1 wherein said first locking means is reciprocal within a passageway extending through said main body portion and having a plunger at the upper end therein, said plunger being normally flush with the area of said main body portion surrounding said passageway when said plug assembly is mounted in said cavity.

7. In the assembly of claim 7 wherein said first locking means includes a plunger body having a first upper portion of a diameter conforming to the diameter of said passageway and a second lower portion of a diameter greater than said first upper portion disposed in a chamber in said main body portion below said passageway of a greater diameter than that of said passageway.

8. In the assembly of claim 7 wherein said first locking means includes a third portion integral with said second lower portion, said locking means including a plurality of detents mounted in a cavity formed in said third portion.

9. In the assembly of claim 8 wherein said first locking means includes a detent biasing portion integral with said plunger disposed in said cavity in said third portion.

10. In the assembly of claim 9 wherein said third portion includes a plurality of spaced openings therethrough, and said detent biasing portion abuts against said detents forcing the same into said last-mentioned openings.

11. In the assembly of claim 10 wherein said last-mentioned openings are peened about the outer surfaces therein forming a restricted opening of a diameter less than the greater diameter of said detents.

12. In the assembly of claim 11 including a spring retainer sleeve encircling said plunger body and a spring encircling said sleeve.

13. In the assembly of claim 12 wherein said sleeve has a first upper flange extending inwardly toward the longitudinal axis of said plunger body and a second lower flange extending outwardly away from said plunger body.

14. In the assembly of claim 13 wherein said chamber in said main body portion has an upper wall and said spring abuts against both said lower flange and the upper wall of said chamber in said main body portion.

15. An assembly for closing off a cavity in a panel having an inner configuration with an opening leading therein and an opening at bottom through said panel comprising:
  a plug assembly having a main body portion having an outer configuration generally related to the configuration of at least the opening leading into said cavity;
  a receptacle having a top, a bottom, and an inner hollow chamber therein with an opening at top leading into said chamber, said receptacle also having an opening at bottom aligned with both the opening at top of said receptacle and an opening at the bottom of said cavity through said panel;
  a fastener extending through the opening at bottom of said receptacle and the opening at bottom of said cavity through said panel thereby holding said receptacle to said panel; and
  a releasable locking means mounted in said plug assembly releasably locked to said receptacle, said releasable locking means comprising a spring biased detent assembly having a plurality of detents therein movable from a first position disposed internally of said releasable locking means to a second position extending out of said releasable locking means whereby, when said releasable locking means extends through the opening at top of said receptacle into the inner chamber thereof, said detents move to said second position extending out of said releasable locking means into the interior of said chamber locking said locking means to said receptacle.

16. In the assembly of claim 15 wherein said main body portion has an upper surface flush with the area of the panel surrounding said cavity and further has a peripheral flange surrounding the upper surface thereof with a resilient O-ring associated therewith sealing off the upper surface of said main body portion from the opening leading into said cavity.

17. In the assembly of claim 15 wherein said releasable locking means is reciprocal within a passageway extending through said main body portion and having a plunger at the upper end therein, said plunger being normally flush with the area of said main body portion surrounding said passageway when said plug assembly is mounted in said cavity.

18. In the assembly of claim 17 wherein said locking means includes a plunger body having a first upper portion of a diameter conforming to the diameter of said passageway and a second lower portion of a diameter greater than said first upper portion disposed in a chamber in said main body portion below said passageway of a greater diameter than that of said passageway.

19. In the assembly of claim 18 wherein said locking means includes a third portion integral with said second lower portion, said locking means including a plurality of detents mounted in a cavity formed in said third portion.

20. In the assembly of claim 19 wherein said locking means includes a detent biasing portion integral with said plunger disposed in said cavity in said third portion.

21. In the assembly of claim 20 wherein said third portion includes a plurality of spaced openings therethrough, and said detent biasing portion abuts against said detents forcing the same into said last-mentioned openings.

22. In the assembly of claim 21 wherein said last-mentioned openings are peened about the outer surfaces therein forming a restricted opening of a diameter less than the greater diameter of said detents.

23. In the assembly of claim 22 including a spring retainer sleeve encircling said plunger body and a spring encircling said sleeve.

24. In the assembly of claim 23 wherein said sleeve has a first upper flange extending inwardly toward the longitudinal axis of said plunger body and a second lower flange extending outwardly away from said plunger body.

25. In the assembly of claim 24 wherein said chamber in said main body portion has an upper wall and said spring abuts against both said lower flange and the upper wall of said chamber in said main body portion.

* * * * *